Sept. 22, 1953  P. SCHLUMBOHM  2,652,698
PORTABLE ICEBOX
Filed Nov. 23, 1951
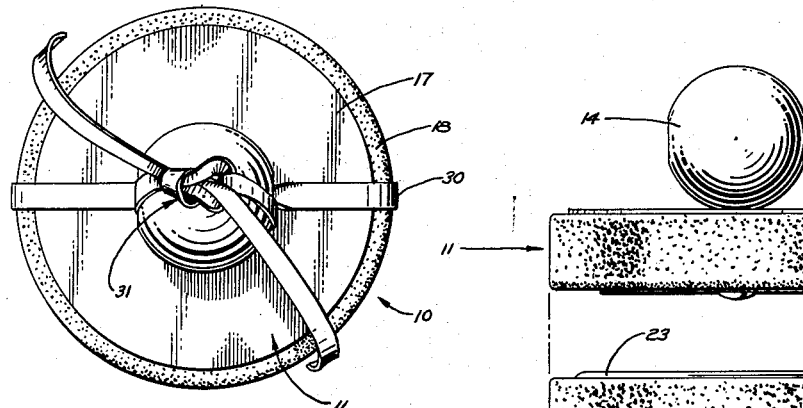
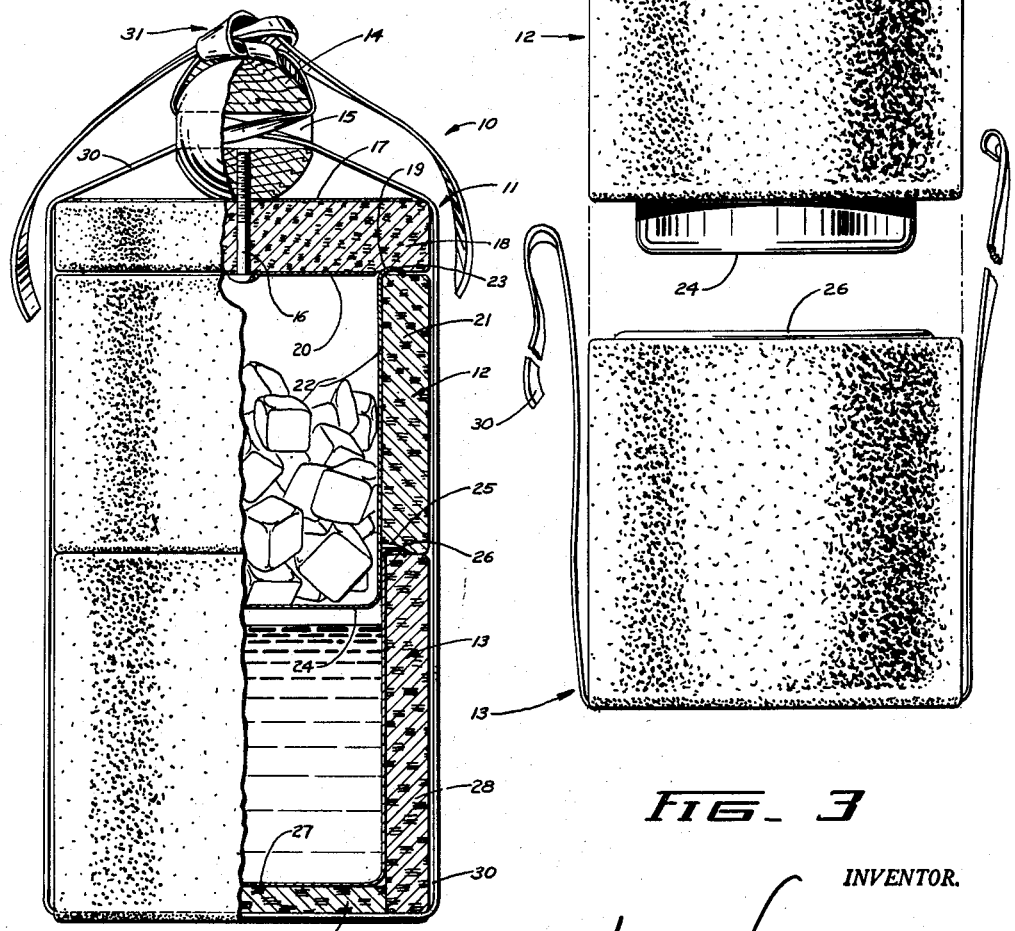
FIG. 1
FIG. 2
FIG. 3
INVENTOR.

Patented Sept. 22, 1953

2,652,698

UNITED STATES PATENT OFFICE 2,652,698

PORTABLE ICEBOX

Peter Schlumbohm, New York, N. Y.

Application November 23, 1951, Serial No. 257,762

16 Claims. (Cl. 62—80)

The invention refers to a portable icebox. More specifically, the new apparatus is designed for carrying ice cubes and food to a picnic in two separate containers, and to provide for heat exchange between the two containers and further to provide heat-insulating means.

The invention is shown by way of example in Figure 1 to Figure 3 of the accompanying drawings. Figure 1 shows a top view of the apparatus. Figure 2 is a side view partly broken away to show a vertical cross-section. Figure 3 is an exploded side view of the apparatus shown in Figure 2.

As shown in Figures 2 and 3, the new food pail comprises two nested food containers 24 and 26. Both containers are slightly tapered. The bottom of the upper container 24 protrudes for a limited length into the tapered open end of the lower container 26, thereby establishing a metal-to-metal contact for the purpose of heat conductivity. By these means ice 22 in the upper container will cool food carried in the lower container. The container 24 is insulated by a cork jacket 12 and the container 26 is insulated by a cork jacket 13 and by a bottom cork plate 29. A cork lid 18 completes the insulating means.

Of course it is not claimed as invention to insulate a container or even to nest containers. The inventive steps claimed in making this new product are solutions of various problems which came up in designing this apparatus, such as:

(a) Nesting the two containers does not provide a sufficient alignment. The inventive step is to secure this alignment by the insulating cork jackets.

(b) Nesting the containers does not provide a sufficient seal against spilling of the contents of the lower container. The inventive step is to establish a seal by a cooperation between a groove 25 in the cork insulation 12 of the upper container and a gasket-shaped rim 26 of the lower container. In analogy a seal is created for the upper container by the cooperation of a groove 19 in the insulating lid 18 and a gasket-shaped rim 23 of the upper container.

(c) The elastic qualities of the cork insulation are further exploited to cooperate with the sealing means and special binding means. The binding means are a rawhide 30 which is tied around the three component parts 11, 12 and 13, shown in Figure 3. The rawhide is knotted by means of a knob 14 with a bore 15. This knob allows to tie a firm straight knot 31 by the arrangement as shown in Figure 1 and Figure 2. A screw 16, a top metal plate 17 and a metal counterplate 20 secure the block 14 firmly to the lid. When tying this rawhide the three component parts 11, 12 and 13 are elastically but firmly held together. A groove in the bottom cork wall 29 is a guide for the rawhide 13.

In manufacturing this new product, special care has to be taken to exploit the elasticity of the cork and the leeway available when containers are nested, to obtain at the same time a liquid-proof seal at the rim 26 and a conductive contact between the two containers in the nesting zone. If this is done, ice may even be placed in the lower container and food in the upper container and this will keep the food cold by said metal conductivity.

On the other hand, the usual procedure will be to fill the upper container with ice cubes, to make them more accessible.

When using this new structure purely as an ice cube pail, one may fill both containers with ice cubes. This arrangement has the advantage over a single container of the combined capacity that the ice cubes in the lower container are protected against heat and against contamination while the ice cubes are taken from the supply in the upper container.

Having two containers available in this new arrangement also makes it possible to carry along two sorts of ice, say, ice cubes in the upper container and shaved ice in the lower container, to cool drinks of various characters.

The technique of tying a rawhide into a loop by means of a perforated solid ball 14, 15, was developed by me in connection with my Chemex coffeemaker. The inventive step taken when applying this technique to the present problem of tying and carrying a portable icebox is to choose a solid ball of such large diameter that the fingers of the hand can pass under the rawhide 30 where the rawhide is spanned over the edge of the lid 18 and over the edges of the bore 15. I am choosing a ball of approximately 3" diameter and this way I obtain a very suitable "handle" formed by the rawhide.

The invention is not limited to an arrangement of two nested containers. As can be concluded from the drawings, the upper container which is schown in Figure 3 as component part 12 may be applied in several units.

Therefore the element 12 is of special invention as a link in a chain of containers. It is characterized by a container of slightly-tapered structure and a cork jacket which covers most of the length of the container except for a nesting bottom section 24, and for a top rim 23. By providing a groove 25 at the end of the cork jacket and adjoining the wall of the container, the alignment and sealing of this container to an adjoining nested container and its cork jacket is secured.

Having now described the nature of my invention and shown by example the manner in which it may be performed I claim as my invention:

1. A portable icebox, characterized by at least two separate containers, each having bottom walls, side walls and an open top, and each container having an insulating jacket covering at least part of said side walls, said side walls being slightly tapered to the extent of allowing the bottom wall of one container to protrude into the upper section of the open end of the other container, said jackets aligning themselves when the containers are nested together, said alignment being effected by the cooperation of the rim of the one container with a gasket-like groove in the insulating jacket of the other container.

2. Icebox as claimed in claim 1, characterized by heat-insulating jackets made from elastic material.

3. In an icebox as in claim 1, sealing means for sealing the open end of one container, said sealing means comprising said aligning rim and said aligning groove together with binding means for compressing the material of the insulating jacket to the effect of pressing said gasket-like groove against said rim.

4. In an icebox as in claim 2, sealing means for sealing the open end of one container, said sealing means comprising said aligning rim and said aligning groove together with binding means for compressing the material of the insulating jacket to the effect of pressing said gasket-like groove against said rim.

5. In an icebox as in claim 1, a cover, said cover and said containers defining the component parts of said icebox, binding means comprising a string of rawhide or similar material tied around the component parts of the icebox and bound by means of a binding tackle attached to one of the component parts of said icebox.

6. In an icebox as in claim 2, a cover, said cover and said containers defining the component parts of said icebox, binding means comprising a string of rawhide or similar material tied around the component parts of the icebox and bound by means of a binding tackle attached to one of the component parts of said icebox.

7. In an icebox as in claim 3, binding means comprising a string of rawhide or similar material tied around the component parts of the icebox and bound by means of a binding tackle attached to one of the component parts of said icebox.

8. In an icebox as in claim 4, a cover, said cover and said containers defining the component parts of said icebox, binding means comprising a string of rawhide or similar material tied around the component parts of the icebox and bound by means of a binding tackle attached to one of the component parts of said icebox.

9. In an icebox as in claim 1, a cover, binding tackle comprising a solid block mounted on said cover having a bore formed therein, said bore receiving a string and being at a sufficient distance from the outer wall of the insulating jacket of said icebox, so as to create a handle by said string where said string is strung from the outer wall of said icebox to said bore.

10. In an icebox as in claim 2, a cover, binding tackle comprising a solid block mounted on said cover having a bore formed therein, said bore receiving a string and being at a sufficient distance from the outer wall of the insulating jacket of said icebox, so as to create a handle by said string where said string is strung from the outer wall of said icebox to said bore.

11. In an icebox as in claim 3, binding tackle comprising a solid block with a bore for blocking said string, said bore being at a sufficient distance from the outer wall of the insulating jacket of said icebox, so as to create a handle by said string where said string is strung from the outer wall of said icebox to said bore.

12. In an icebox as in claim 4, binding tackle comprising a solid block with a bore for blocking said string, said bore being at a sufficient distance from the outer wall of the insulating jacket of said icebox, so as to create a handle by said string where said string is strung from the outer wall of said icebox to said bore.

13. In an icebox as in claim 5, a cover, said binding tackle comprising a solid block mounted on said cover having a bore formed therein, said bore receiving said string and being at a sufficient distance from the outer wall of the insulating jacket of said icebox, so as to create a handle by said string where said string is strung from the outer wall of said icebox to said bore.

14. In an icebox as in claim 6, a cover, said binding tackle comprising a solid block mounted on said cover having a bore formed therein, said bore receiving said string and being at a sufficient distance from the outer wall of the insulating jacket of said icebox, so as to create a handle by said string where said string is strung from the outer wall of said icebox to said bore.

15. In an icebox as in claim 7, said binding tackle comprising a solid block with a bore for blocking said string, said bore being at a sufficient distance from the outer wall of the insulating jacket of said icebox, so as to create a handle by said string where said string is strung from the outer wall of said icebox to said bore.

16. In an icebox as in claim 8, said binding tackle comprising a solid block with a bore for blocking said string, said bore being at a sufficient distance from the outer wall of the insulating jacket of said icebox, so as to create a handle by said string where said string is strung from the outer wall of said icebox to said bore.

PETER SCHLUMBOHM.

References Cited in the file of this patent

UNITED STATES PATENTS

| Number | Name | Date |
|---|---|---|
| 522,306 | Schuyler | July 3, 1894 |
| 659,150 | King | Oct. 2, 1900 |
| 1,847,254 | Murray | Mar. 1, 1932 |